(12) United States Patent
Laitinen et al.

(10) Patent No.: US 7,258,278 B2
(45) Date of Patent: Aug. 21, 2007

(54) ELECTRONIC MODULE READER

(75) Inventors: Timo T. Laitinen, Viiala (FI); Hongxue Zhang, Oulu (FI)

(73) Assignee: Nokia Corporation, Espoo (FI)

( * ) Notice: Subject to any disclaimer, the term of this patent is extended or adjusted under 35 U.S.C. 154(b) by 137 days.

(21) Appl. No.: 11/143,242

(22) Filed: Jun. 1, 2005

(65) Prior Publication Data
US 2006/0273174 A1 Dec. 7, 2006

(51) Int. Cl.
*G06K 7/00* (2006.01)
(52) U.S. Cl. .................... 235/451; 235/486
(58) Field of Classification Search ............. 235/383, 235/441, 492, 475, 493, 486, 487; 361/732, 361/785; 436/63
See application file for complete search history.

(56) References Cited

U.S. PATENT DOCUMENTS

| | | | | | |
|---|---|---|---|---|---|
| 4,887,188 | A | * | 12/1989 | Yoshida et al. | 361/684 |
| 5,930,110 | A | * | 7/1999 | Nishigaki et al. | 361/686 |
| 6,463,396 | B1 | * | 10/2002 | Nishigaki | 702/132 |
| 6,595,413 | B1 | * | 7/2003 | Sugita | 235/380 |
| 6,603,723 | B2 | * | 8/2003 | Minase | 720/673 |
| 6,634,562 | B1 | * | 10/2003 | Noro et al. | 235/492 |
| 2002/0018426 | A1 | * | 2/2002 | Minase | 369/75.2 |
| 2003/0148530 | A1 | * | 8/2003 | Lauks | 436/63 |
| 2003/0236013 | A1 | | 12/2003 | Hu et al. | 439/188 |

FOREIGN PATENT DOCUMENTS

| | | |
|---|---|---|
| EP | 0 843 274 A3 | 5/1998 |
| EP | 0 982 679 A1 | 3/2000 |
| JP | 200285204 * | 10/2000 |
| WO | WO 03/005286 A1 | 1/2003 |
| WO | WO 2004/032289 A1 | 4/2004 |

* cited by examiner

*Primary Examiner*—Thien Minh Le
(74) *Attorney, Agent, or Firm*—Harrington & Smith, PC (57) ABSTRACT

An electronic module reader including a housing having a receiving area adapted to removably receive an electronic module; electrical signal contacts connected to the housing; and a module detection and ejection pre-warning switch. The switch is adapted to be contacted by the electronic module in the receiving area. The switch is adapted to signal presence and absence of the electronic module in the receiving area, and adapted to signal movement of the electronic module from a home mated position with the electrical signal contacts towards an electrically disconnected position.

16 Claims, 11 Drawing Sheets

ELECTRONIC MODULE READER

BACKGROUND OF THE INVENTION

1. Field of the Invention

The invention relates to an electronic module reader and, more particularly, to a system for detecting presence of a module in the reader and pre-warning regarding ejection of the module from the reader.

2. Brief Description of Prior Developments

Electronic module readers, such as a memory card readers for example, are provided in portable electronic devices, such as mobile telephones, digital cameras and hand-held games, for example. The readers allow a user to removably insert different modules for use by the device. In the past, the some readers were provided with a first switch for detecting the presence of a memory module in the reader. The reader could also have a separate second switch for signally a pre-warning if the module was being removed or ejected from the reader. This second switch was to allow for "hot swapping" of modules without having to turn OFF power to the device.

Figure 1:
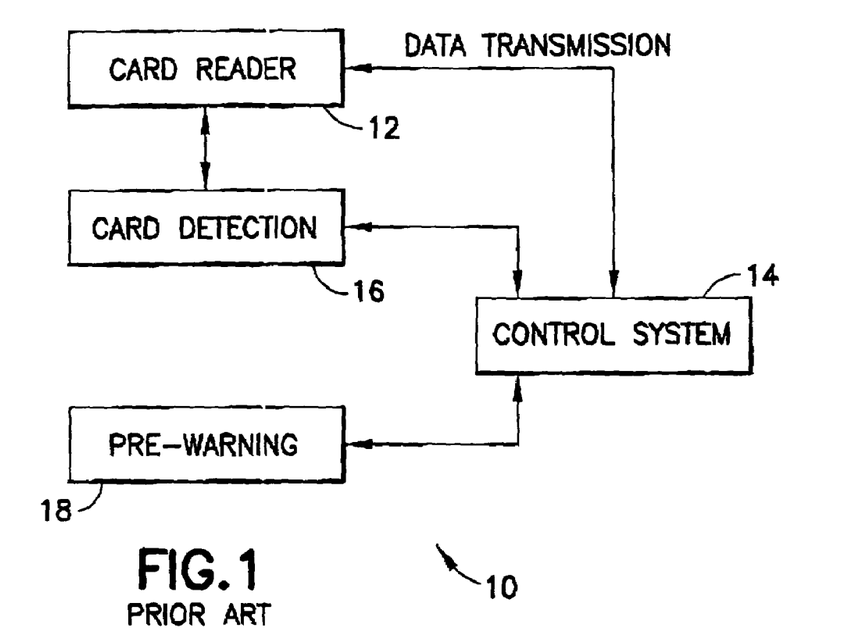
FIG. 1 is a diagram showing connections of a card reader and switches to a control system in a conventional portable electronic device.

Referring to FIG. 1, there is shown a diagram of a conventional system used in a portable electronic device 10. The card reader 12 is coupled to a control system 14. The device includes a card detection switch 16 or card polling and a separate pre-warning switch 18, such as a reader door or hatch switch. The two switches 16, 18 are coupled to the control system for indicating presence of a memory card in the reader and a pre-warning to provide a certain time period to the control system before the memory card it removed. The switches 16, 18 have separate connections to the control system 14. The disadvantages with this type of system is increased difficulties in design, more space demanded because of a door switch, and higher probability of failures due to more connections and components.

One type of system uses a card detection switch which is closed at a mated position for an ON state, and which is open at a card ejected position for an OFF state. The switch contact is closed ON during operation which can cause poor reliability from bouncing and contact problems due to corrosion or mechanical reasons. Bouncing refers to inadvertent opening of a contact by impulse or momentum which could cause the contact to inadvertently switch from an ON state to an OFF state. This creates a reliability issue regarding the contact. A continuous closed ON state also can cause problems with corrosion and other reliability issues. Card ejection pre-warning time is only about 1 ms from switch detection to the moment the card is disconnected.

Another type of system uses a card detection switch which is open at a mated position for an OFF state, and which is open at a card ejected position for an OFF state. This can provide a longer ejection pre-warning time, but there is no card detection information when the card is IN or OUT of the reader because the status of the switch when mated and when OUT of the reader is OFF for both. Thus, it does not provide adequate card detection capability.

There is a desire to provide a reader having both a module detection capability as well as a pre-warning capability, but at a reduced cost. There is also a desire to provide a reader having both a module detection capability as well as a pre-warning capability with an increase reliability. There is a desire to provide a reader having both a module detection capability as well as a pre-warning capability, but with a smaller size and which is easier assembly than in conventional devices. There is also a desire to provide a reader which provides a minimum ejection pre-warning time of about 250 ms or more.

SUMMARY OF THE INVENTION

In accordance with one aspect of the invention, an electronic module reader is provided including a housing having a receiving area adapted to removably receive an electronic module; electrical signal contacts connected to the housing; and a module detection and ejection pre-warning switch. The switch is adapted to be contacted by the electronic module in the receiving area. The switch is adapted to signal presence and absence of the electronic module in the receiving area, and adapted to signal movement of the electronic module from a home mated position with the electrical signal contacts towards an electrically disconnected position.

In accordance with another aspect of the invention, an electronic module reader is provided comprising a housing having a receiving area adapted to removably receive an electronic module; electrical signal contacts connected to the housing; and a module ejection pre-warning switch adapted to signal movement of the electronic module towards an electrically disconnected position with the electrical signal contacts. The switch is in an OFF home mated position when the electronic module is in a home mated position in the receiving area. The switch is adapted to be moved to an ON module detection position when the electronic module is moved towards a fully disconnected position with the electrical signal contacts.

In accordance with another aspect of the invention, an electronic module reader is provided comprising a housing having a receiving area adapted to removably receive an electronic module; electrical signal contacts connected to the housing; and a module ejection pre-warning switch adapted to signal movement of the electronic module towards an electrically disconnected position with the electrical signal contacts. The switch comprises a movable contact arm adapted to alternatively make electrical contact with two spaced contact areas of the switch. The switch comprises an OFF home mated position when the electronic module is at a home mated position in the receiving area with the contact arm not making contact with either of the spaced contact areas.

In accordance with one method of the invention, a method of signaling position of an electronic module in a reader is provided comprising providing the reader with a switch adapted to be actuated by the electronic module, wherein the switch is in an unmated ON position when the electronic module is not connected to the reader; and moving the switch to an OFF home mated position when the electronic module is inserted into a home position in the reader.

BRIEF DESCRIPTION OF THE DRAWINGS

The foregoing aspects and other features of the invention are explained in the following description, taken in connection with the accompanying drawings, wherein.

DETAILED DESCRIPTION OF THE PREFERRED EMBODIMENTS

Figure 2:
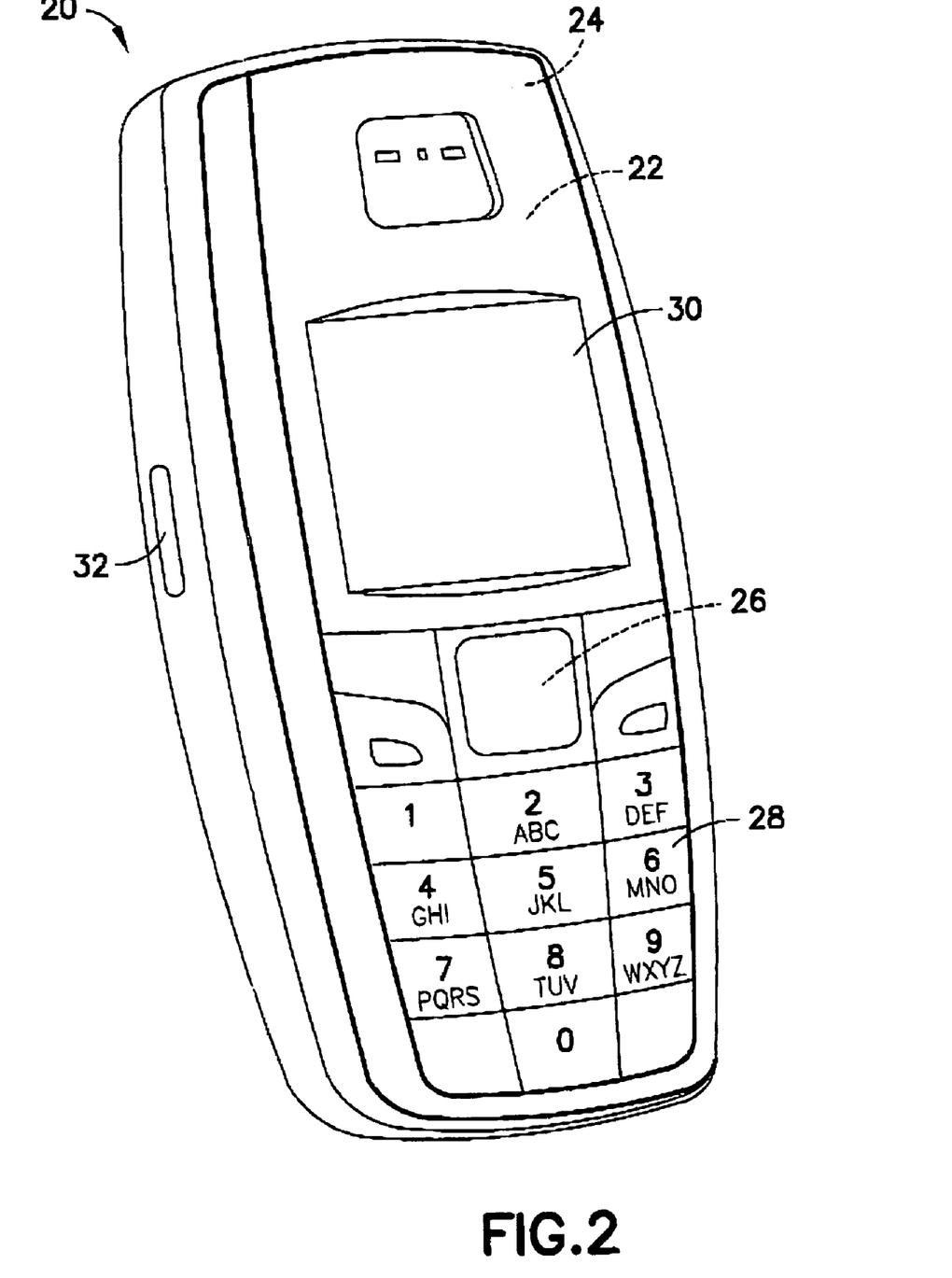
FIG. 2 is a perspective view of a portable electronic device incorporating features of the invention.

Referring now to FIG. 2, there is shown a perspective view of a portable electronic device 20 incorporating features of the invention. Although the invention will be described with reference to the exemplary embodiments shown in the drawings, it should be understood that the invention can be embodied in many alternate forms of embodiments. In addition, any suitable size, shape or type of elements or materials could be used.

In this embodiment the device 20 comprises a mobile telephone. However, in alternate embodiments the device could comprise any suitable type of electronic device adapted to removably receive an electronic module, such as a memory card. For example, the device 20 could comprise a hand-held gaming device, a PDA, or a notebook computer for example. The telephone 20 generally comprises a transceiver 22 connected to an antenna 24, a controller 26, a keypad 28 and a display 30. The telephone 20 can have any suitable type of features as known in the art.

The telephone 20 also comprises an electronic module reader 32 coupled to the controller 26. In this embodiment the reader 32 is shown with an entrance at the side of the telephone. However, the entrance could be at any suitable location including the rear of the telephone in a battery compartment area. The entrance could also have a door or hatch to close the entrance.

Figure 3:
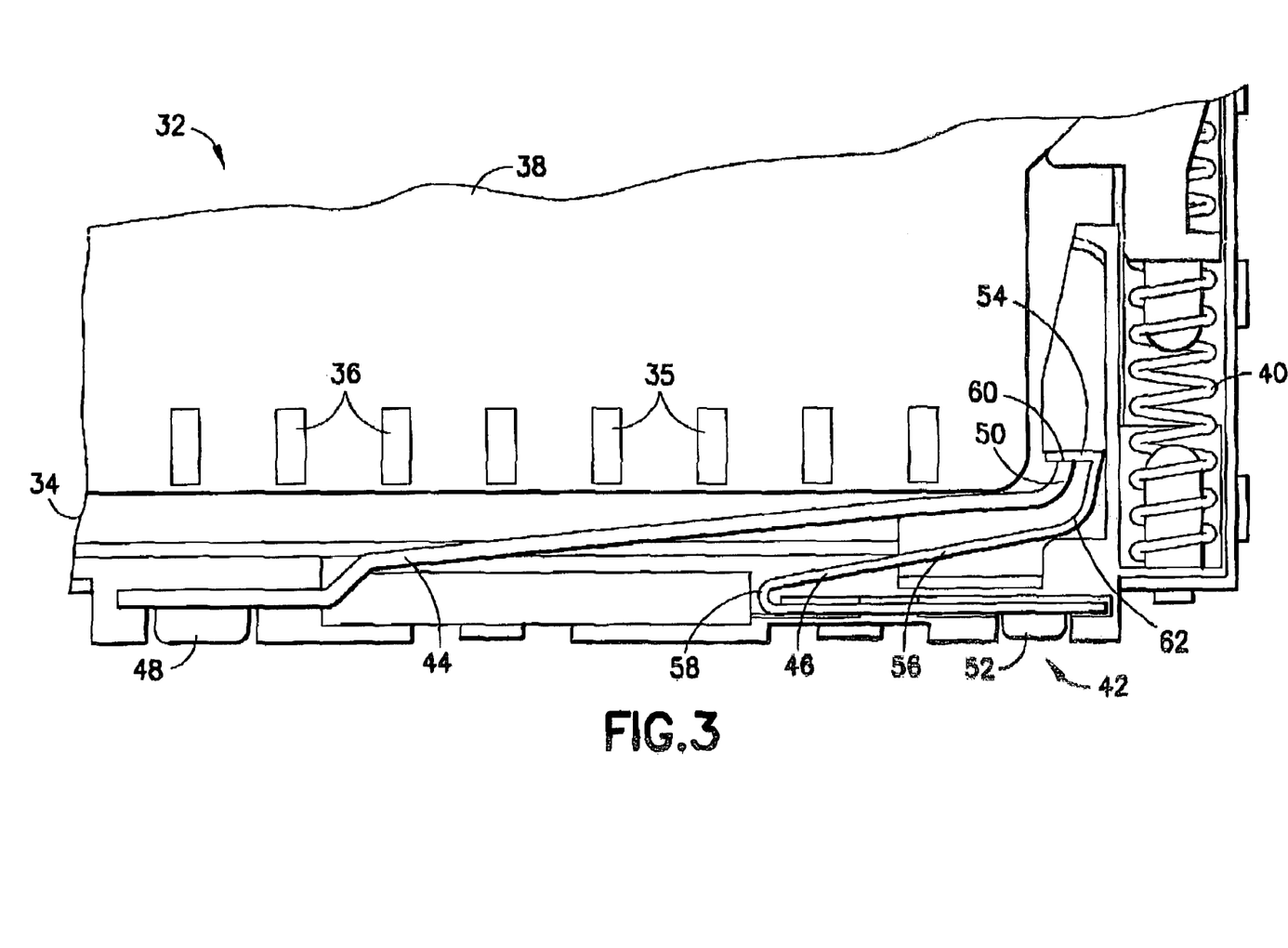
FIG. 3 is a partial view of the reader shown in FIG. 2 at an unmated ON position.

Referring also to FIG. 3, a partial view of the reader is shown. The reader 32 generally comprises a housing 34 and electrical signal contacts 35. The contacts 35 can comprise spring contacts with contact areas 36 for making electrical connection with contact pads on a module inserted into the reader 32. The housing 34 forms a receiving area 38 for removably receiving the module. The reader preferably comprises a system 40 for latching onto the housing of the module and ejecting the module, such as with a push-to-insert and push-to-eject latching system (a push-push system). However, any suitable type of latching and/or ejection system could be provided.

Figure 4:
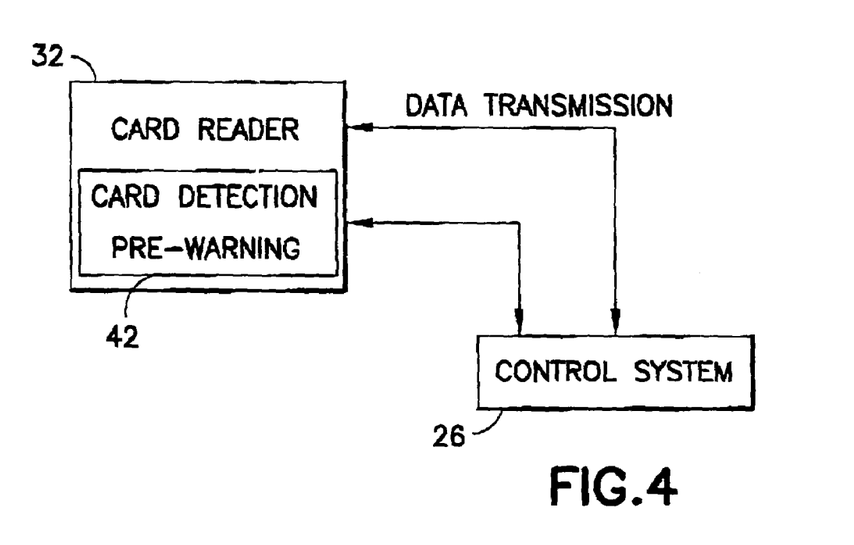
FIG. 4 is a diagram showing connections to the card reader and controller of the device shown in FIG. 2.

The reader 32 also comprises a switch 42. The switch 42 is coupled to the controller 26 as seen in FIG. 4. The switch 42 is a combined module detection switch and ejection pre-warning switch. In particular, the switch is adapted to be contacted by the electronic module in the receiving area to signal the presence or absence of the electronic module in the receiving area. The switch is also adapted to signal movement of the electronic module from a home mated position towards an electrically disconnected position.

In the embodiment shown, the switch 42 generally comprises a first member 44 and a second member 46. In alternate embodiments the switch could comprise move than two members, such as three members for example. The first member 44 comprises a deflectable arm which is adapted to be contacted and moved by a front end of a memory card. In an alternate embodiment, the deflectable arm could be moved by an intermediate member(s) which is moved by the memory card or the system 40. A first end 48 of the arm is stationarily attached to the housing 34. The second end 50 of the arm extends in a general cantilever fashion and is resiliently deflectably in a general cantilever fashion relative to the housing. The first member 44 is made of electrically conductive material. The first end 48 is electrically connected to the controller 26, such as by a surface mount soldered connection to a printed circuit board for example.

The second member 46 generally comprises a first end 52, a second end 54 and an intermediate portion 56. The second member 46 comprises a deflectable section, formed by the intermediate portion, which is adapted to be contacted and moved by the first member 44. The first end 52 of the second member 46 is stationarily attached to the housing 34. The intermediate portion 56 extends from the first end 52 with a deflectable bend 58. The intermediate portion 56 extends from the bend 58 in a general cantilever fashion and is resiliently deflectably in a general cantilever fashion relative to the housing. The second end 54 is located at the end of the intermediate portion. In this embodiment, the second end 54 has a section located in front of the second end 50 of the first member 44. The section has a rear facing first contact surface 60 which is adapted to be contacted by the second end 50 of the first member 44. The intermediate portion 56 has a forward facing second contact surface 62 which is also adapted to be contacted by the first member 44 as further described below. The second member 46 is made of electrically conductive material and the first end 52 is electrically connected to the controller 26, such as by a surface mount soldered connection to a printed circuit board for example.

FIG. 3 shows the reader 32 before insertion of the electronic module into the reader. In this situation, the first member 44 of the switch makes electrical contact with the second member 46 at the first contact surface 60. Thus, the switch 42 is in a closed ON state or condition in this unmated ON position.

Figure 5:
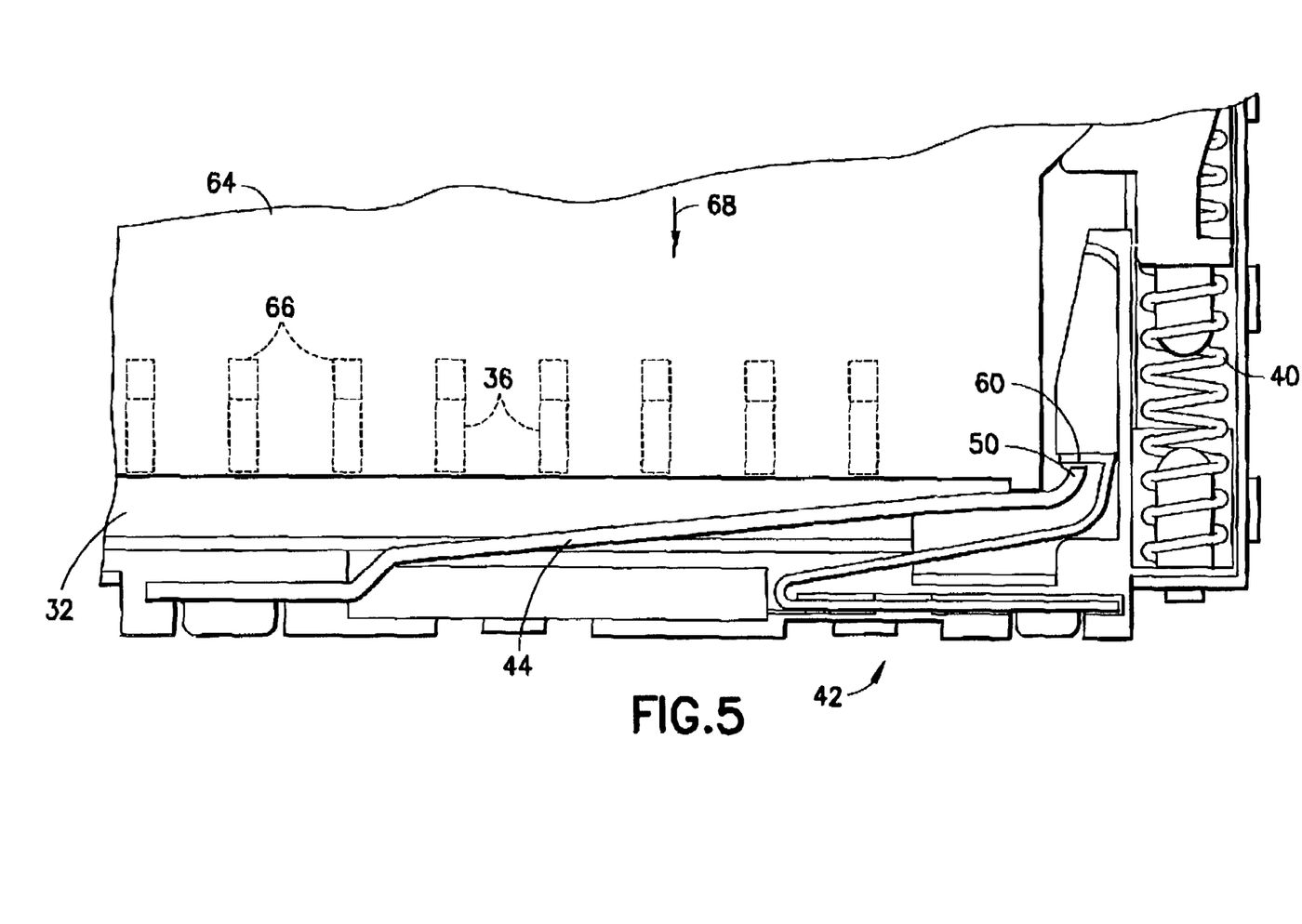
FIG. 5 is a partial view as in FIG. 3 with an electronic module partially inserted or ejected with the reader.

Referring also to FIG. 5, the reader 32 is shown with an electronic module 64, such as a memory card or memory module, partially inserted into the receiving area 38. The module is inserted as indicated by arrow 68. As the module 64 is inserted, the front end of the module 64 contacts the first member 44 of the switch 42 and deflects the second end 50 of the first member 44 off of contact with the first contact surface 60 of the second member 46. This causes the switch 42 to be turned OFF at an OFF pre-warning position. This alone, or in combination with a subsequent ON module detection position shown in FIG. 6 could be used to signal the controller 26 that the electronic module 64 has been inserted. In a preferred embodiment, the electrical contact pads 66 of the module 64 make electrical contact with the contact areas 36 of the electrical signal contacts before movement of the first member 44 off of contact with the first contact surface 60 of the second member 46.

Figure 6:
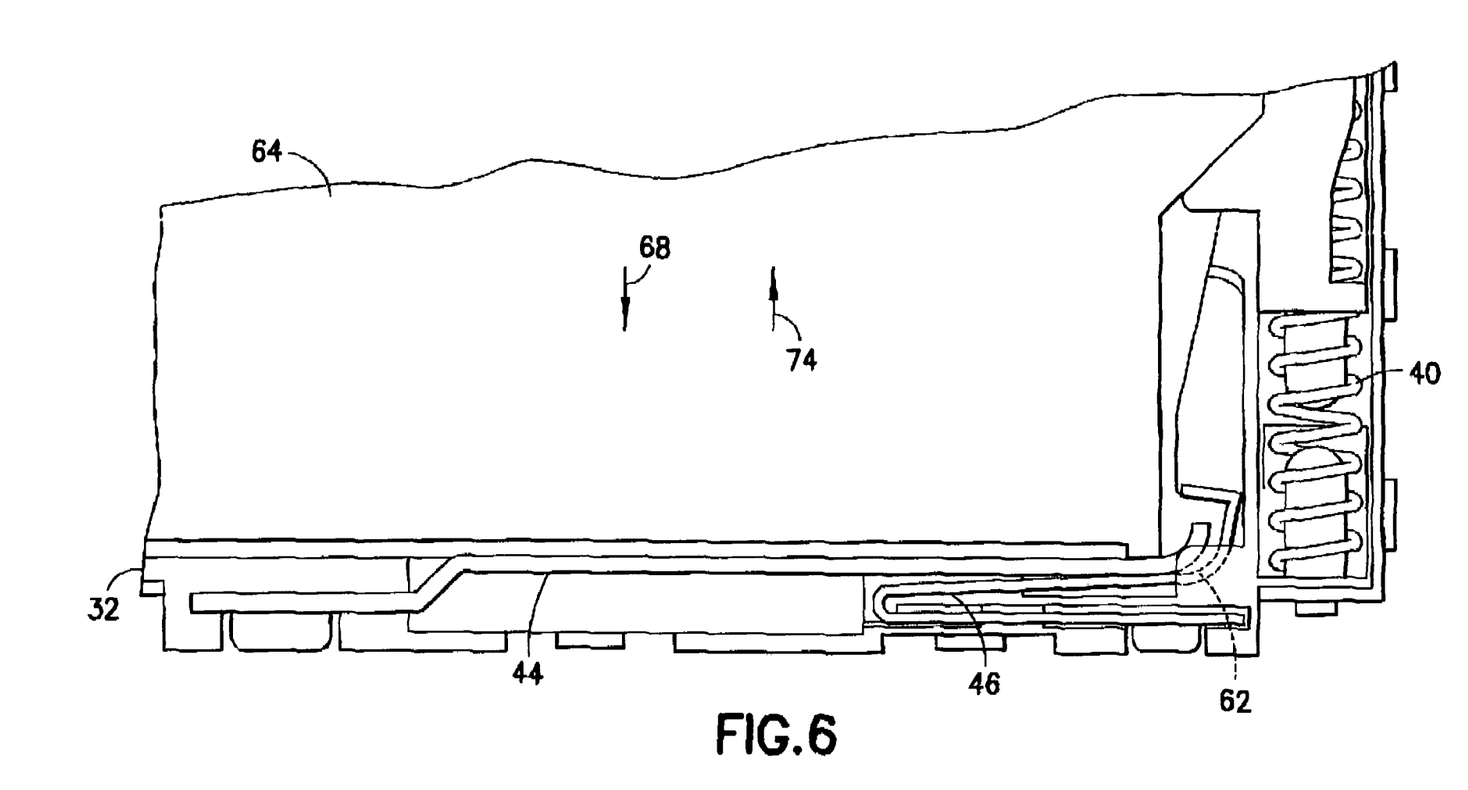
FIG. 6 is a partial view as in FIG. 5 with the electronic module fully inserted into the reader.

Referring also FIG. 6, the module 64 is shown fully inserted into the receiving area to a module detection position. In this position the module 64 is inserted to cause actuation of the latch and ejection system 40. The module 64 pushes the first member 44 of the switch 42 into electrical contact with the second contact surface 62 of the second member 46. Thus, the switch is turned ON at an ON module detection position. The sequence of the switch 42 being turned from an ON state to an OFF state and then to an ON state again (the sequence of FIGS. 3, 5 and 6) can signal the controller 26 that the module 64 has been inserted into the reader 32. The contact pads 66 are connected with the contact areas 36 of the signal contacts, so the controller can actuate the reader (or perhaps delay actuation of the reader until the module is located at the home mated position shown in FIG. 7). As seen in comparing FIGS. 5 and 6, the second member 46 can be deflected from the pushing contact by the first member 44, but still maintain an electrical connection, such as by the two members 44, 46 sliding along each other as they deflect.

Figure 7:
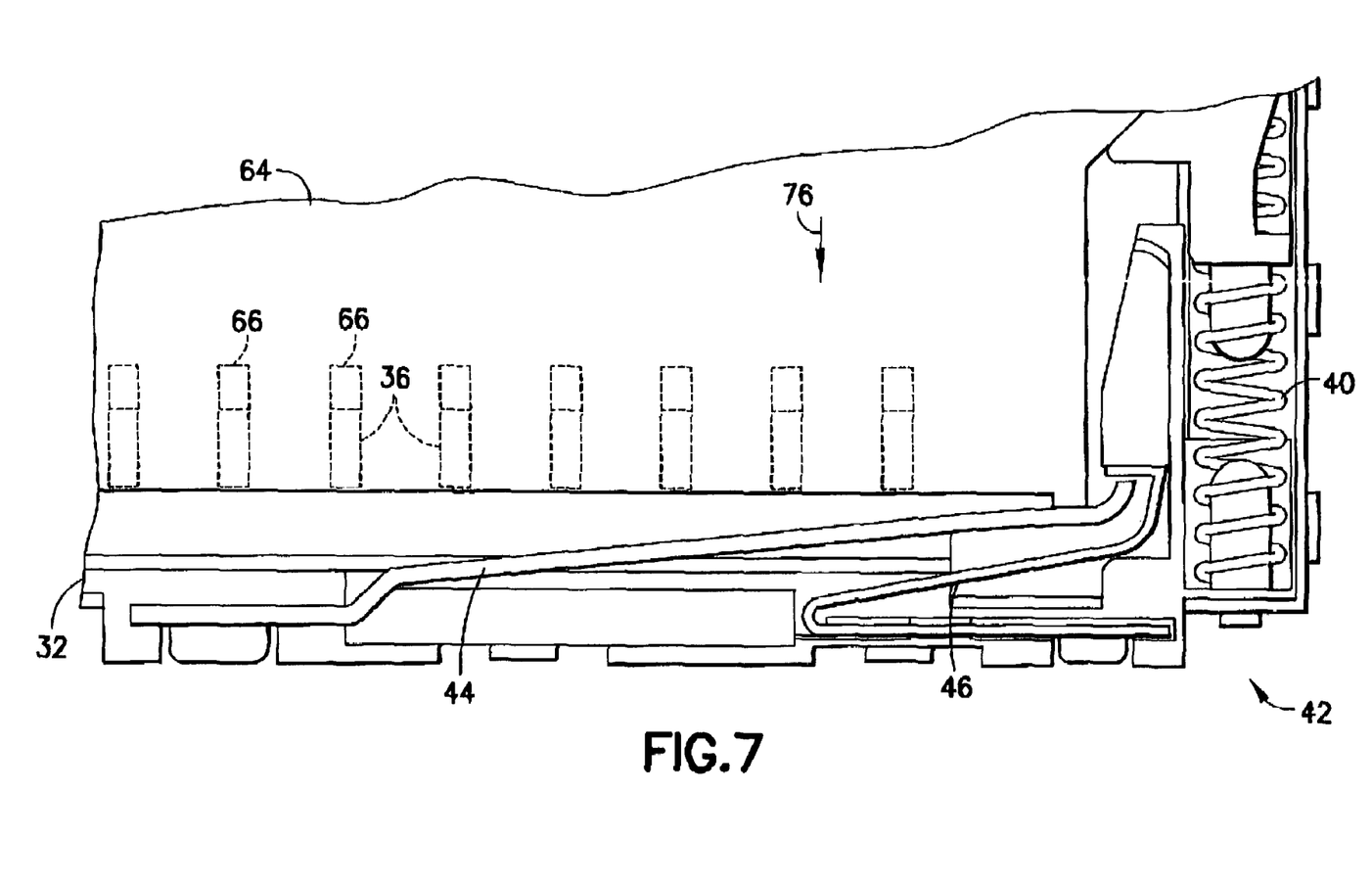
FIG. 7 is a partial view as in FIG. 5 with the electronic module located at a home mated position in the reader and the switch at an OFF home mated position.

When the user release pushing force on the outer end of the module 64, the latching and ejection system 40 can bias the module as indicated by arrow 74, and latch the module, at its home mated position shown in FIG. 7. This allows the first member 44 of the switch to deflect to an OFF home mated position as shown in FIG. 7 wherein the first member 44 is not in electrical contact with the second member 46 of the switch. Thus, the switch is in an open OFF state. The second member 46 can deflect back to its undeflected position, and neither of the contact surfaces 60, 62 are contacted by the first member 44.

Figure 8:
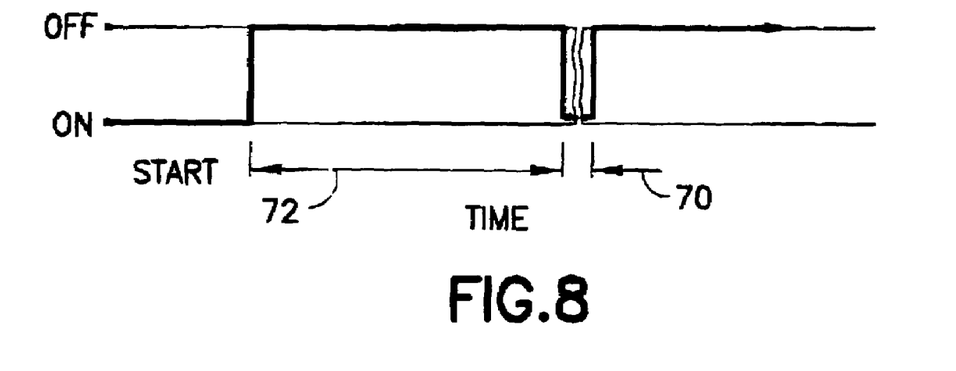
FIG. 8 is a diagram showing ON and OFF states of the switch during insertion of the module into the reader.

The contact pads 66 of the module 64 are electrically connected to the contact areas 36 of the signal contacts. Thus, the module 64 is operably coupled to the controller 26. FIG. 8 shows a time line of ON and OFF signals from the switch to the controller 26 during insertion of the module into the reader. The ON time 70 will depend upon how long the user (or system 40) keeps the module at the position shown in FIG. 6. The OFF time 72 will depend on how long it takes for the first member 44 to transition contact between the two contact surfaces 60, 62.

To remove the module 64 from the reader 32 the user (or the system 40) can push the module in as indicated by arrow 76 from the position shown in FIG. 7 to the position shown in FIG. 6. The latch feature of the system 40 will become disengaged such that release of pushing force against the module 64 by the user will result in the module 64 being pushed by the system 40 from the position shown in FIG. 6 through the position shown in FIG. 5, eventually to the position shown in FIG. 3 (though the module might still be partially in the receiving area 38; just not deflecting the first member 44. This causes the switch 42 to transition from the OFF state shown in FIG. 7, to the ON state shown in FIG. 6, to the OFF state shown in FIG. 5 and then to the ON state shown in FIG. 3. This time line can be seen with reference to FIG. 9.

The time 78 between contact of the first member 44 with the two contact surfaces 60, 62 is preferably about 250 ms or more. The time 80 may depend upon how long the user keeps the module 64 at the ON position shown in FIG. 6. For example, it has been determined through measurements with different users that the minimum time is about 200 ms, with about 300 ms being the average. Time 78 is about 1 ms. Therefore, the total of times 78 and 80 may be more than 250 ms as a non-limiting example. In practice, the delay time need/requirement depends on the application. For example, the memory card embodiment has been found to benefit from the use of about 250 ms. If more time is found to be needed, then the construction may be modified so as to increase movement distances and/or to modify the movement speed through the use of friction elements or similar mechanisms. Rather than a push-push system, a mechanical system to eject the module could be provided wherein the user does not touch the outer end of the module. Instead, the system 40 could control the time that the switch is ON at the position shown in FIG. 6 during ejection of the module from the reader.

Figure 9:
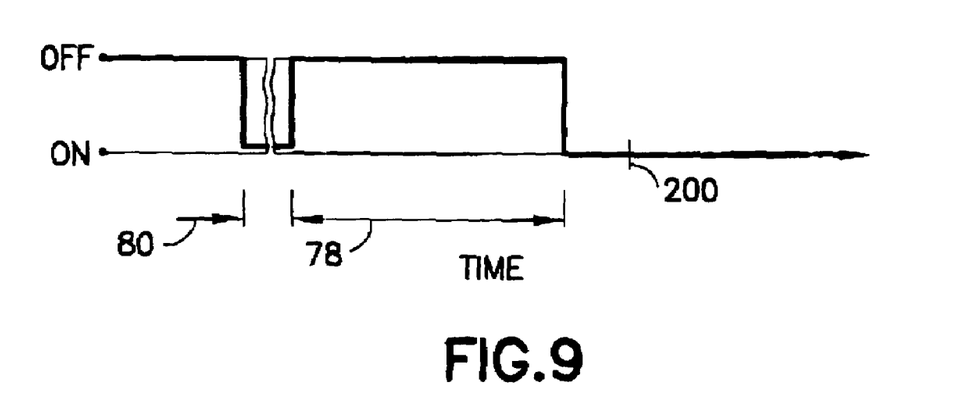
FIG. 9 is a diagram showing ON and OFF states of the switch during ejection of the module from the reader.

The transition of the signal from the switch 42 from OFF to ON, then to OFF again as shown in FIG. 9 can signal the controller 26 that the module 64 is about to be electrically disconnected from the contact areas 36 of the signal contacts at point 200. Preferably the time provided by the pre-warning, before actual electrical disconnection occurs, is about 300 ms or more. The pre-warning signal comes before the contact areas 36 disengage from the contact pads 66; about 250 ms or more for example. With this pre-warning, the controller can shut down operation of the reader without interfering with operation of the device 20, and to allow for "hot swapping" of modules in the reader without the device 20 having to be powered down.

In the conventional system shown in FIG. 1, the control system needs to handle the card detection and pr-warning signals separately by different paths. With the invention, as seen in FIG. 4, the new technique allows both card detection and pre-warning along a single path and with a single switch. This can save manufacturing time and expense, as well as make for a lighter and more compact device.

The switch 42 can provide a dual function switch for both real time card detection as well as an ejection pre-warning of sufficient time for the controller to act on the pre-warning signal, such as 250 ms or more for example. The invention can provide high reliability with a switch contact open during normal operation and no bouncing which could disturb functionality. There can be significant reduction in costs because only one switch is required and only one signal path is required. In an alternate embodiment, the card reader could comprise two switches for the card detection function and the ejection pre-warning function; rather than having the two functions integrated into a single switch.

Figure 10:
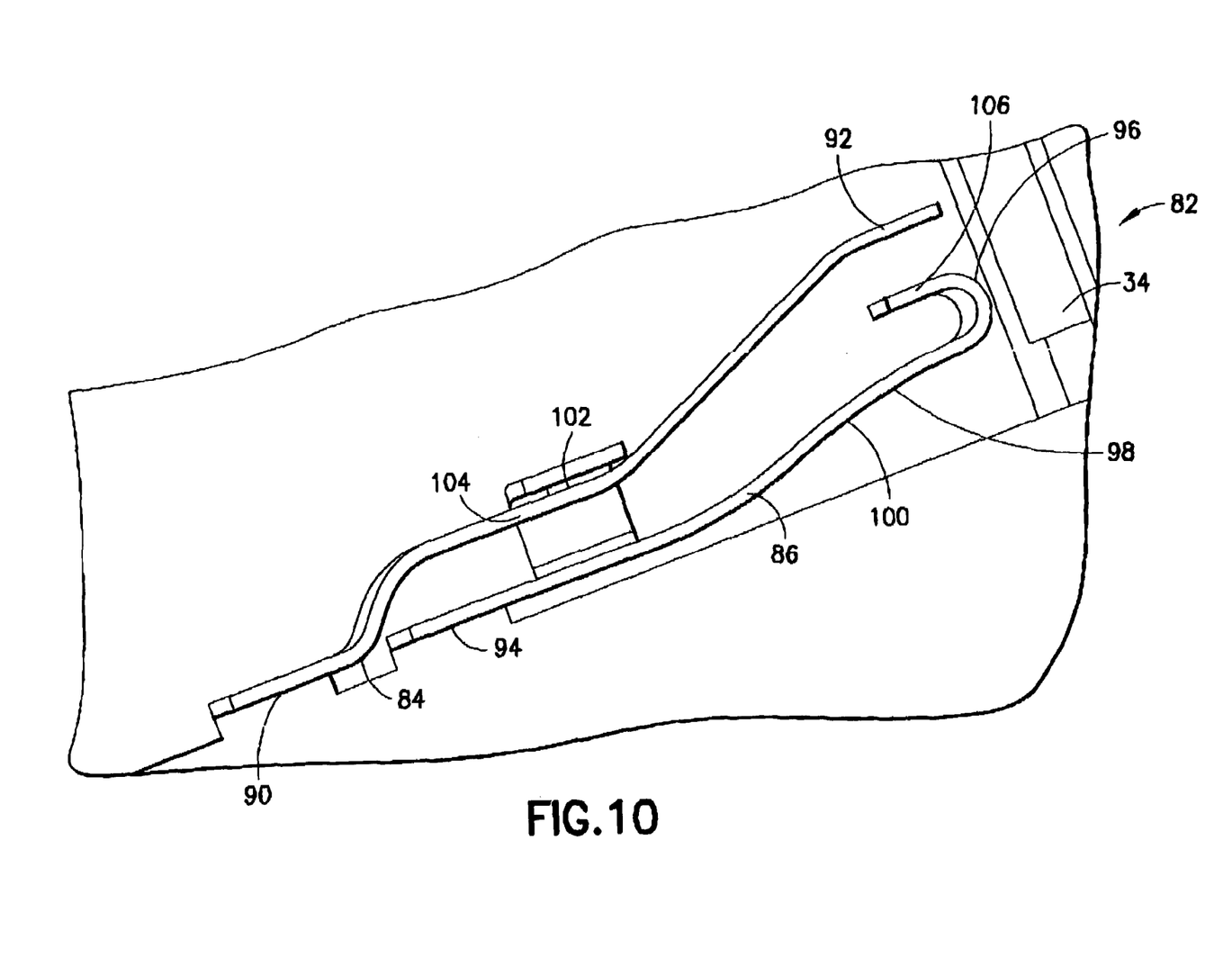
FIGS. 10-12 are perspective views shown an alternate embodiment of the dual-function reader switch at three different positions.
Figure 11:
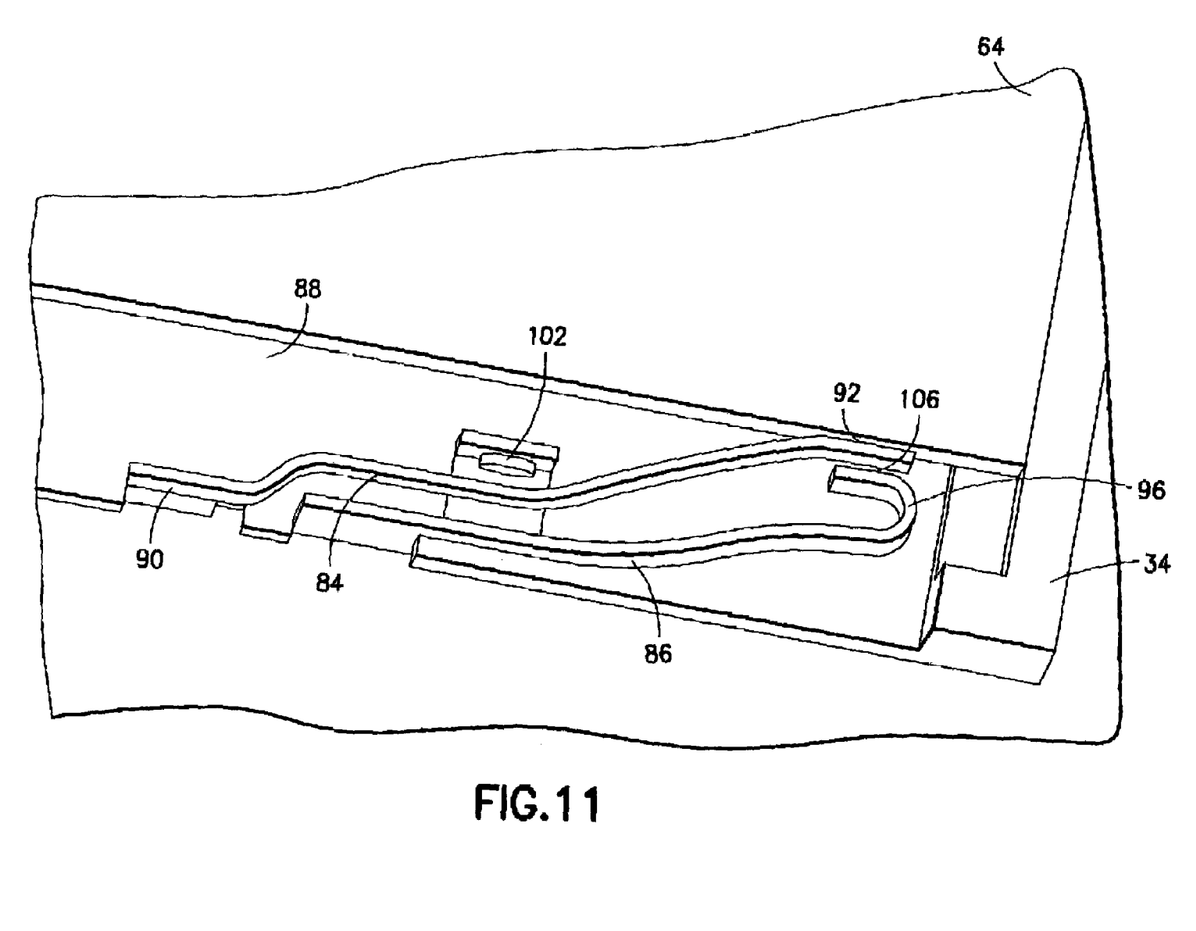
Figure 12:
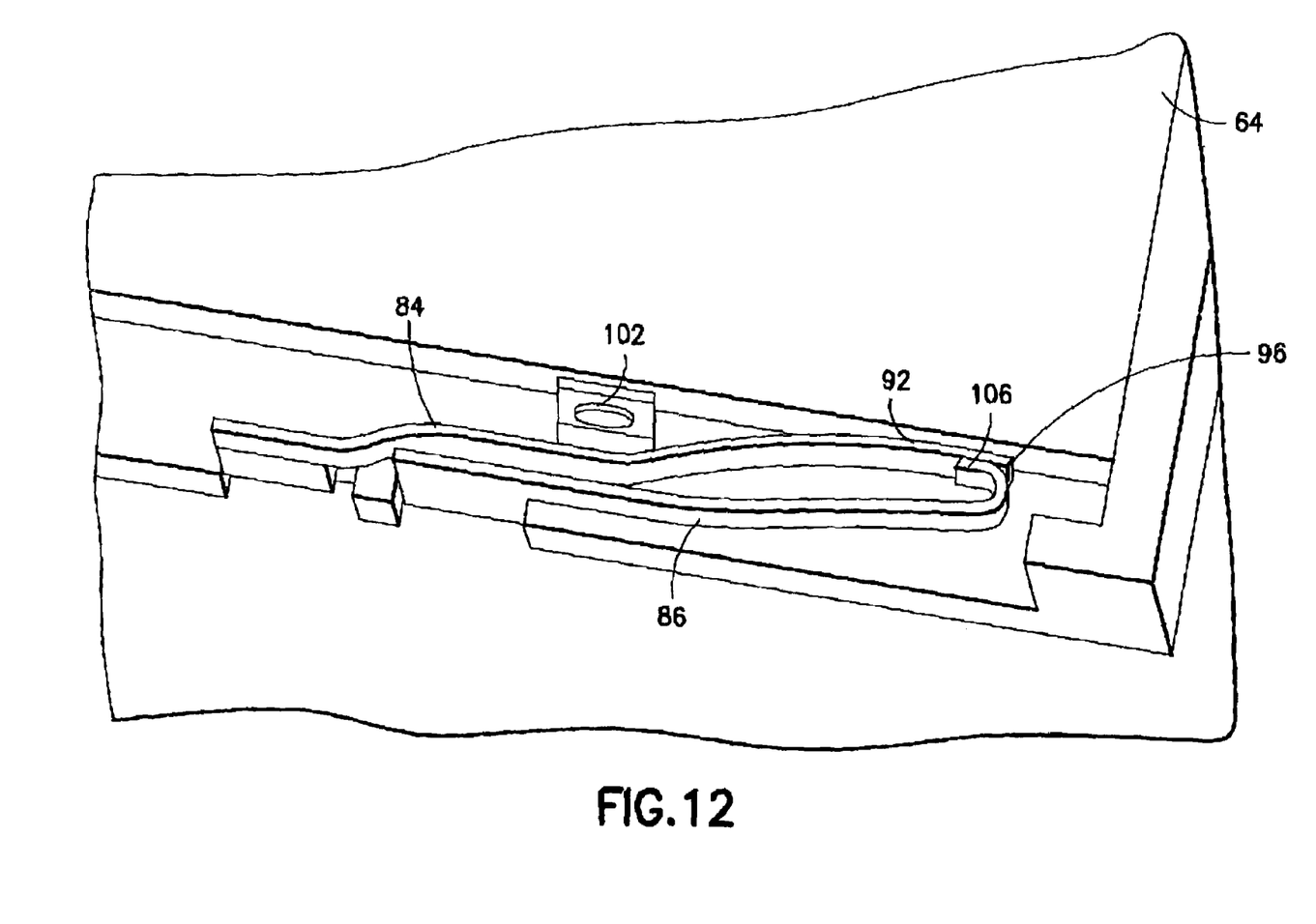

Referring now to FIGS. 10-12 there is shown an alternate embodiment of the invention. In this embodiment the reader has a dual function switch 82 with a first member 84 and a second member 86. The first member 82 comprises a deflectable arm which is adapted to be contacted and moved by a front end 88 of a memory card 64. In an alternate embodiment, the deflectable arm could be moved by an intermediate member(s) which is moved by the memory card. A first end 90 of the arm is stationarily attached to the housing 34. The second end 92 of the arm extends in a general cantilever fashion and is resiliently deflectably in a general cantilever fashion relative to the housing. The first member 84 is made of electrically conductive material and the first end 90 is electrically connected to the controller 26, such as by a surface mount soldered connection to a printed circuit board for example.

The second member 86 generally comprises a first end 94, a second end 96 and an intermediate portion 98. The second member 86 comprises a deflectable section, formed by the intermediate portion, which is adapted to be contacted and moved by the first member 84. The first end 94 of the second member 86 is stationarily attached to the housing 34. The intermediate portion 98 extends from the first end 94 with a deflectable section 100. The intermediate portion 100 extends in a general cantilever fashion and is resiliently deflectably in a general cantilever fashion relative to the housing. The second end 96 is located at the end of the intermediate portion. In this embodiment, the second end 96 has a section located behind of the second end 92 of the first member 84. The second member 86 has a first contact surface 102 which is adapted to be contacted by an intermediate portion 104 of the first member 84. The first contact surface 102 is located on a substantially stationary general U-shaped section of the second member 86, facing towards the rest of the first member. The second end 96 has a second contact surface 106 which is also adapted to be contacted by the first member 84, but at the second end 92 as seen in FIG. 12. The second member 86 is made of electrically conductive material and the first end 94 is electrically connected to the controller 26, such as by a surface mount soldered connection to a printed circuit board for example.

FIG. 10 shows the switch 82 in a first closed ON state when the module is not connected to the reader and the switch is in an unmated ON position. FIG. 11 shows the switch 82 in an open OFF state when the module is at its OFF home mated position, or during connection of the module, or during ejection from the reader. FIG. 12 shows the switch in a second closed ON state when the switch is at its ON module detection position.

In an alternate embodiment the ON/OFF sequence could be reversed or changed. For example, the switch could be maintained at an OFF state at its unmated position. Insertion of a card or module into the receiving area could move the switch to an OFF state at the home mated position. An intermediate ON state could be provided between the two OFF states. Subsequent removal of the module could actuate an OFF-ON-OFF state switching scenario by the switch with a pre-warning signal, or perhaps merely an ON-OFF switching with the pre-warning signal being at least 250 ms because of the time it takes to eject the module. Other switching scenarios could be provided so long as there is a pre-warning of about 250 ms or more before electrical disconnection of the module such that the controller can have enough time to deactivate or suspend the electronic module reader system.

Figure 13:
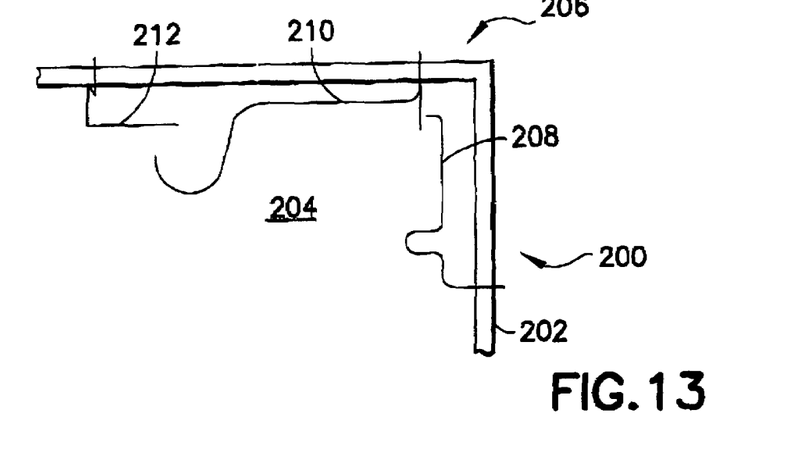
FIGS. 13-15 illustrate a further embodiment of the invention.
Figure 14:
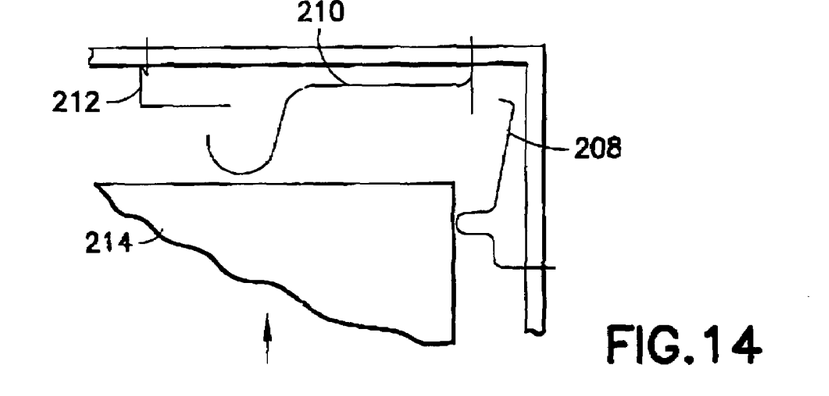
Figure 15:
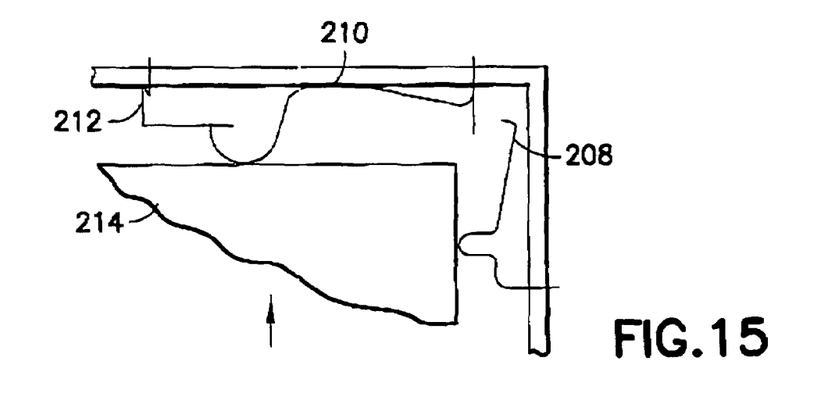

Referring also to FIGS. 13-15 another alternate embodiment is shown. In this embodiment the card reader 200 comprises a housing 202 with a card receiving area 204 and a card presence and pre-warning switch 206. The switch 206 comprises three members 208, 210, 212. FIG. 13 shows the reader before insertion of the card into the card receiving area. The first member 208 is in contact with the second member 210. The second member 210 is not in contact with the third member. The switch is in an ON state because of the contact between the first and second members 208, 210. When the card 214 is inserted into the receiving area as shown in FIG. 14, the card moves the first member 208 off of contact with the second member 210. Thus the switch 206 is switched to an OFF state. Switching of the switch 206 from an ON state to an OFF state can signal insertion of the card in the reader. Further insertion of the card causes the second member 210 to be deflected into contact with the third member 212. Thus, the switch is switched to an ON state. Release of the card by the user allows the push-push system to return the card to the position shown in FIG. 14 with the switch located at the OFF state at a home mated position.

Removal of the card merely comprises a reverse process. The card is pushed in by the user from the position shown in FIG. 14 to the position shown in FIG. 15. This switches the switch 206 from the OFF state to an ON state. The user releases the card and the push-push system ejects the card at least partially from the receiving area 204. The switch 206 transitions from the position shown in FIG. 15, through the position shown in FIG. 14 to the unmated position shown in FIG. 13. Actuation of the switch 206 at the position shown in FIG. 15 can be used as a pre-warning signal before actually electrical disconnection of the card from contacts of the reader occur (preferably about 250 ms or more). This is the amount of time it takes the push-push ejection system to move the card from the position shown in FIG. 15 to a position when the electrical contact pads of card become disconnected from the electrical contacts of the reader.

It should be understood that the foregoing description is only illustrative of the invention. Various alternatives and modifications can be devised by those skilled in the art without departing from the invention. Accordingly, the invention is intended to embrace all such alternatives, modifications and variances which fall within the scope of the appended claims.

What is claimed is:

1. An electronic module reader comprising:
    a housing having a receiving area adapted to removably receive an electronic module;
    electrical signal contacts connected to the housing; and
    a module detection and ejection pre-warning switch, wherein the switch is adapted to be contacted by the electronic module in the receiving area, wherein the switch is adapted to signal presence and absence of the electronic module in the receiving area, and adapted to signal movement of the electronic module from a home mated position with the electrical signal contacts towards an electrically disconnected position,
    wherein the switch comprises a movable contact arm adapted to alternatively make electrical contact with two spaced contact areas of the switch, wherein the switch is adapted to be OFF at a home mated position of the switch when the electronic module is located at the home mated position in the receiving area, and wherein the switch is adapted to be in an unmated ON position when the electronic module is not connected to the reader.

2. An electronic module reader as in claim 1 wherein the switch is adapted to be moved to an OFF pre-warning position before the electronic module is electrically disconnected from the electrical signal contacts at the unmated ON position.

3. An electronic module reader comprising:
    a housing having a receiving area adapted to removably receive an electronic module;
    electrical signal contacts connected to the housing; and
    a module detection and ejection pre-warning switch, wherein the switch is adapted to be contacted by the electronic module in the receiving area, wherein the switch is adapted to signal presence and absence of the electronic module in the receiving area, and adapted to signal movement of the electronic module from a home mated position with the electrical signal contacts towards an electrically disconnected position,
    wherein the switch is adapted to be in an unmated ON position when the electronic module is not connected to the reader, wherein the switch is adapted to be OFF at a home mated position of the switch when the electronic module is located at the home mated position in the receiving area, and wherein, during insertion of the electronic module into the receiving area, the switch is adapted to be turned from the ON unmated position to an OFF pre-warning position and then to an ON module detection position before the switch moves to the OFF home mated position.

4. An electronic module reader comprising:
    a housing having a receiving area adapted to removably receive an electronic module;
    electrical signal contacts connected to the housing; and a module detection and ejection pre-warning switch, wherein the switch is adapted to be contacted by the electronic module in the receiving area, wherein the switch is adapted to signal presence and absence of the electronic module in the receiving area, and adapted to signal movement of the electronic module from a home mated position with the electrical signal contacts towards an electrically disconnected position, wherein the switch is adapted to be in an unmated ON position when the electronic module is not connected to the reader, wherein the switch is adapted to be moved to an OFF pre-warning position before the electronic module is electrically disconnected from the electrical signal contacts at the unmated ON position, and wherein, when the electronic module is being removed from the reader, the switch is adapted to be moved to an ON position between the OFF home mated position and the OFF pre- warning position.

5. A portable electronic communication device comprising:
a transceiver;
a controller connected to the transceiver;
and an electronic module reader as in claim 1 coupled to the controller.

6. An electronic module reader comprising:
a housing having a receiving area adapted to removably receive an electronic module;
electrical signal contacts connected to the housing; and
a module ejection pre-warning switch adapted to signal movement of the electronic module towards an electrically disconnected position with the electrical signal contacts, wherein the switch is in an OFF home mated position when the electronic module is in a home mated position in the receiving area, and wherein the switch is adapted to be moved to an ON module detection position when the electronic module is moved towards a fully disconnected position with the electrical signal contacts, wherein the switch comprises a movable contact arm adapted to alternatively make electrical contact with two spaced contact areas of the switch.

7. An electronic module reader as in claim 6 wherein, when the electronic module is being connected to the reader between the fully disconnected position of the electronic module with the electrical signal contacts and the home mated position of the electronic module in the receiving area, the switch is adapted to be turned from an unmated ON position to an OFF pre-warning position, to the ON module detection position before coming to rest at the OFF home mated position.

8. An electronic module reader comprising:
a housing having a receiving area adapted to removably receive an electronic module;
electrical signal contacts connected to the housing; and
a module ejection pre-warning switch adapted to signal movement of the electronic module towards an electrically disconnected position with the electrical signal contacts, wherein the switch is in an OFF home mated position when the electronic module is in a home mated position in the receiving area, and wherein the switch is adapted to be moved to an ON module detection position when the electronic module is moved towards a fully disconnected position with the electrical signal contacts,
wherein the switch is adapted to be located at an unmated ON position when the electronic module is at the fully disconnected position with the electrical signal contacts.

9. An electronic module reader comprising:
a housing having a receiving area adapted to removably receive an electronic module;
electrical signal contacts connected to the housing; and
a module ejection pre-warning switch adapted to signal movement of the electronic module towards an electrically disconnected position with the electrical signal contacts, wherein the switch comprises a movable contact arm adapted to alternatively make electrical contact with two spaced contact areas of the switch, and wherein the switch comprises an OFF home mated position when the electronic module is at a home mated position in the receiving area with the contact arm not making contact with either of the spaced contact areas.

10. An electronic module reader as in claim 9 wherein the contact arm is adapted to contact a first one of the contact areas when the switch is not contacted by the electronic module.

11. An electronic module reader as in claim 9 wherein the contact arm is adapted to contact a second one of the contact areas at an ON module detection position when the electronic module is inserted into the receiving area to signal detection of the electronic module in the receiving area and before the switch comes to rest at the OFF home mated position.

12. An electronic module reader as in claim 9 wherein the contact arm is adapted to be located at an OFF pre-warning position as the switch is moved from an unmated ON position and the OFF home mated position.

13. A method of signaling position of an electronic module in a reader comprising:
providing the reader with a switch adapted to be actuated by the electronic module, wherein the switch is in an unmated ON position when the electronic module is not connected to the reader;
moving the switch to an OFF home mated position when the electronic module is inserted into a home position in the reader; and
moving the switch to an OFF pre-warning position between the unmated ON position and the OFF home mated position.

14. A method as in claim 13 further comprising moving the switch to an ON module detection position between the OFF pre-warning position and the OFF home mated position.

15. An electronic module reader comprising:
a housing having a receiving area adapted to removably receive an electronic module;
electrical signal contacts connected to the housing; and
a module detection and ejection pre-warning switch, wherein the switch is adapted to be contacted by the electronic module in the receiving area, wherein the switch is adapted to signal absence of the electronic module in the receiving area, and adapted to signal movement of the electronic module from a home mated position with the electrical signal contacts towards an electrically disconnected position, and adapted to signal at least two different depths of insertion of the module in the receiving area.

16. An electronic module reader comprising:
a housing having a receiving area adapted to removably receive an electronic module;
electrical signal contacts connected to the housing; and
a module detection and ejection pre-warning switch, wherein the switch is adapted to be contacted by the electronic module in the receiving area, and wherein the switch comprises a movable contact arm which is moveable among three ON/OFF switch positions.

* * * * *